(12) United States Patent
Masterson et al.

(10) Patent No.: US 8,265,168 B1
(45) Date of Patent: *Sep. 11, 2012

(54) PROVIDING TRICK MODE FOR VIDEO STREAM TRANSMITTED OVER NETWORK

(75) Inventors: Anthony D. Masterson, Saratoga, CA (US); Amir M. Mobini, San Francisco, CA (US)

(73) Assignee: Zenverge, Inc., Santa Clara, CA (US)

(*) Notice: Subject to any disclaimer, the term of this patent is extended or adjusted under 35 U.S.C. 154(b) by 720 days.

This patent is subject to a terminal disclaimer.

(21) Appl. No.: 12/362,423

(22) Filed: Jan. 29, 2009

Related U.S. Application Data

(60) Provisional application No. 61/025,634, filed on Feb. 1, 2008.

(51) Int. Cl.
*H04N 7/12* (2006.01)
*H04N 11/02* (2006.01)
*H04N 11/04* (2006.01)

(52) U.S. Cl. .................................. 375/240.25
(58) Field of Classification Search .............. 375/240.25
See application file for complete search history.

(56) References Cited

U.S. PATENT DOCUMENTS

| | | | |
|---|---|---|---|
| 5,467,134 A | 11/1995 | Laney et al. | |
| 5,481,312 A * | 1/1996 | Cash et al. ............... | 375/240.28 |
| 5,544,266 A | 8/1996 | Koppelmans et al. | |
| 5,838,597 A | 11/1998 | Pau et al. | |
| 6,014,706 A * | 1/2000 | Cannon et al. ............ | 709/231 |
| 6,075,918 A * | 6/2000 | Strongin et al. .......... | 386/326 |
| 6,160,844 A | 12/2000 | Wilkinson | |
| 6,272,180 B1 | 8/2001 | Lei | |
| 6,434,197 B1 | 8/2002 | Wang et al. | |
| 6,445,738 B1 * | 9/2002 | Zdepski et al. .......... | 375/240.01 |
| 6,526,100 B1 * | 2/2003 | Kalliokulju et al. ..... | 375/240.26 |
| 6,738,980 B2 * | 5/2004 | Lin et al. ................. | 725/88 |
| 7,085,320 B2 | 8/2006 | Ouyang et al. | |
| 7,116,830 B2 | 10/2006 | Srinivasan | |
| 7,143,432 B1 | 11/2006 | Brooks et al. | |
| 7,558,760 B2 * | 7/2009 | Fang et al. .............. | 705/57 |
| 7,830,800 B1 | 11/2010 | Masterson et al. | |
| 8,005,149 B2 | 8/2011 | Lerner et al. | |
| 2002/0015576 A1 * | 2/2002 | Gordon et al. .......... | 386/68 |
| 2003/0002583 A1 | 1/2003 | Geerlings | |
| 2003/0028643 A1 | 2/2003 | Jabri | |
| 2003/0093800 A1 * | 5/2003 | Demas et al. ............ | 725/90 |
| 2003/0093801 A1 * | 5/2003 | Lin et al. ................. | 725/90 |
| 2003/0140159 A1 * | 7/2003 | Campbell et al. ....... | 709/231 |
| 2003/0177251 A1 * | 9/2003 | Suzuki et al. ........... | 709/229 |

(Continued)

OTHER PUBLICATIONS

Fu, Chang-Hong et al. "Efficient Reverse-Play Algorithms for MPEG Video With VCR Support", Jan. 2006.*

(Continued)

*Primary Examiner* — Michael Simitoski
(74) *Attorney, Agent, or Firm* — Fenwick & West LLP

(57) ABSTRACT

Systems and methods for performing a trick mode of video streams transmitted over a network without increasing the amount of data transmitted over the network. A video server transrates a source video stream to a target video stream by removing pictures from the source video stream. The target video stream has a reduced number of pictures compared to the source video stream. Therefore, when the target video stream is played on a display device, the target video stream has a playback speed faster than the playback speed of the source video stream.

18 Claims, 12 Drawing Sheets

U.S. PATENT DOCUMENTS

| | | | |
|---|---|---|---|
| 2003/0198293 A1 | 10/2003 | Chen et al. | |
| 2004/0093618 A1* | 5/2004 | Baldwin et al. | 725/101 |
| 2004/0230994 A1* | 11/2004 | Urdang et al. | 725/88 |
| 2005/0053141 A1 | 3/2005 | Holcomb et al. | |
| 2005/0125832 A1* | 6/2005 | Jost et al. | 725/95 |
| 2005/0135783 A1* | 6/2005 | Crinon | 386/68 |
| 2005/0232497 A1 | 10/2005 | Yogeshwar et al. | |
| 2005/0262529 A1* | 11/2005 | Neogi et al. | 725/31 |
| 2005/0276323 A1 | 12/2005 | Martemyanov et al. | |
| 2005/0281332 A1 | 12/2005 | Lai et al. | |
| 2006/0072662 A1 | 4/2006 | Tourapis et al. | |
| 2006/0218602 A1* | 9/2006 | Sherer et al. | 725/88 |
| 2007/0025688 A1* | 2/2007 | Pejhan | 386/68 |
| 2007/0036218 A1 | 2/2007 | Burazerovic | |
| 2007/0058718 A1 | 3/2007 | Shen et al. | |
| 2007/0058926 A1* | 3/2007 | Virdi et al. | 386/68 |
| 2007/0127519 A1* | 6/2007 | Hasek et al. | 370/466 |
| 2007/0189732 A1* | 8/2007 | Pothana et al. | 386/112 |
| 2007/0280356 A1 | 12/2007 | Zhang et al. | |
| 2008/0212774 A1* | 9/2008 | Moors et al. | 380/201 |
| 2009/0049186 A1* | 2/2009 | Agnihotri et al. | 709/231 |
| 2009/0217328 A1* | 8/2009 | Colmagro et al. | 725/91 |

OTHER PUBLICATIONS

Lee, Wei Jen and Wen Jen Ho. "Adaptive Frame-Skipping for Video Transcoding", 2003.*

Lee, Jeyun and Byeungwoo Jeon. "Fast mode decision for H.264", 2004.*

Lin, Chia-Wen et al. "MPEG Video Streaming with VCR Functionality", Mar. 2001.*

Psannis, Kostas E. et al. "MPEG-based Interactive Video Streaming: A Review", 2003.*

Tan, Yap-Peng et al. "Video Transcoding for Fast Forward/Reverse Video Playback", 2002.*

Wee, Susie J. and Bhaskaran Vasudev. "Compressed-Domain Reverse Play of MPEG Video Streams", 1998.*

Wee, Susie J. "Manipulating Temporal Dependencies in Compressed Video Data with Applications to Compressed-Domain Processing of MPEG Video", Mar. 1999.*

Youn, J. et al., "Motion Vector Refinement for High-Performance Transcoding," IEEE Transactions on Multimedia, Mar. 1999, pp. 30-40, vol. 1, No. 1.

de With, P.H.N. et al., "An MPEG Decoder with Embedded Compression for Memory Reduction," IEEE Transactions on Consumer Electronics, Aug. 1998, pp. 545-555, vol. 44, No. 3.

Lee, T.Y., "A New Frame-Recompression Algorithm and its Hardware Design for MPEG-2 Video Decoders," IEEE Transactions on Circuits and Systems for Video Technology, Jun. 2003, vol. 13, No. 6, pp. 529-534.

"MPEG-2—The basics of how it works," Hewlett Packard, published at least as early as Oct. 31, 1999, 17 pages.

PCT International Search Report and Written Opinion, PCT/US09/32138, Mar. 25, 2009, 8 pages.

"Streaming Live MPEG-4, The VBasics," VBrick Systems, Inc., 2003, 13 pages.

United States Office Action, U.S. Appl. No. 11/611,356, Dec. 10, 2009, 20 pages.

U.S. Office Action, U.S. Appl. No. 11/611,356, Sep. 16, 2009, 18 pages.

U.S. Office Action, U.S. Appl. No. 11/611,356, Apr. 16, 2009, 20 pages.

United States Office Action, U.S. Appl. No. 11/448,447, Mar. 30, 2011, 10 pages.

United States Office Action, U.S. Appl. No. 11/448,447, Nov. 18, 2010, 8 pages.

United States Office Action, U.S. Appl. No. 11/567,678, Apr. 29, 2011, 15 pages.

United States Office Action, U.S. Appl. No. 11/567,678, Oct. 18, 2011, 13 pages.

United States Office Action, U.S. Appl. No. 11/486,190, Apr. 25, 2011, 9 pages.

United States Office Action, U.S. Appl. No. 11/486,190, Dec. 17, 2010, 8 pages.

United States Office Action, U.S. App. No. 12/361,440, Jan. 23, 2012, 10 pages.

United States Office Action, U.S. Appl. No. 11/486,190, Jan. 3, 2012, 10 pages.

United States Office Action, U.S. Appl. No. 11/567,678, Feb. 13, 2012, 13 pages.

Wee, S. et al, Compression-Domain Video Processing, Hewlett-Packard Company, 2002, pp. 1-35.

* cited by examiner

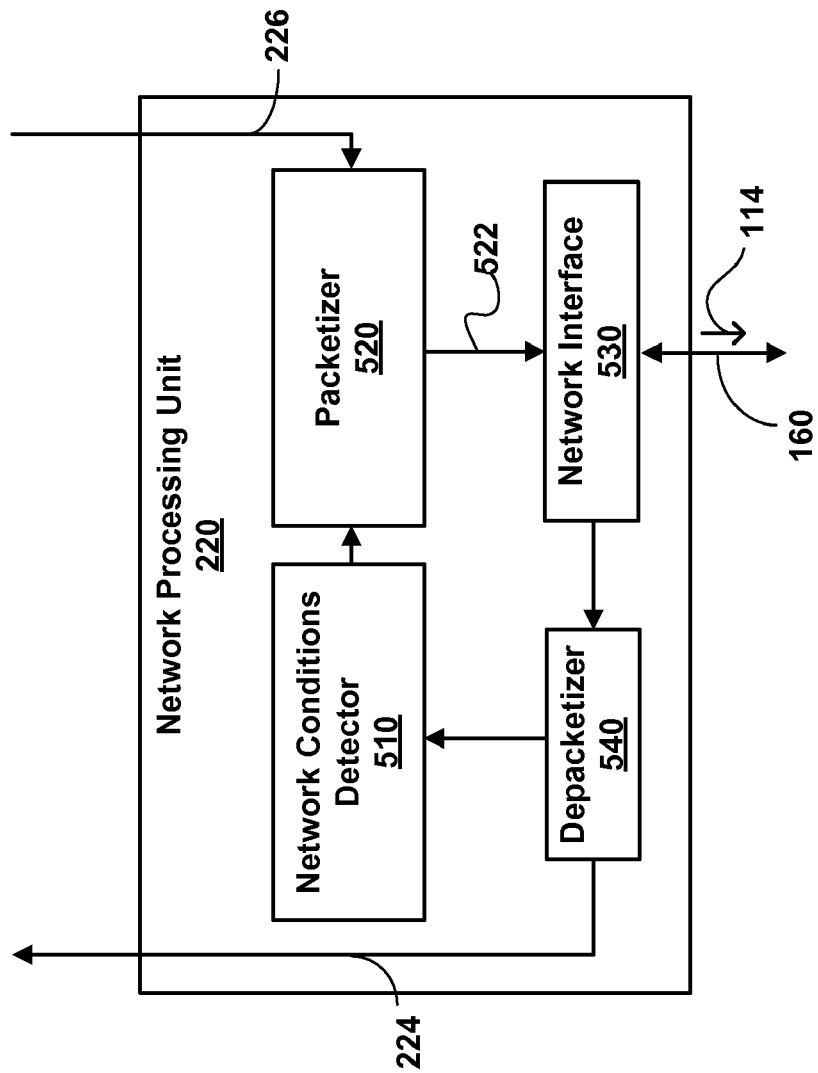

PROVIDING TRICK MODE FOR VIDEO STREAM TRANSMITTED OVER NETWORK

CROSS-REFERENCE TO RELATED APPLICATION

This application claims priority under 35 U.S.C. §119(e) to U.S. Provisional Patent Application No. 61/025,634 entitled "Providing Trick Mode For Video Stream Transmitted Over Network," filed on Feb. 1, 2008, which is incorporated by reference herein in its entirety.

BACKGROUND

1. Field of Art

The present disclosure relates generally to a system for transmitting a video stream to a display device over a network, and more specifically, to a system for changing the playback speed of a video stream transmitted to a display device over a network.

2. Description of Related Art

Conventionally, multimedia such as video and audio has been delivered using analog delivery mediums such as NTSC (National Television System Committee) signals, and has been stored using analog storage mediums such as video cassette recorders. The analog signals typically contain uncompressed frames of video. Thus, a significant part of the electronic components in a display device are dedicated to analog receiving hardware, and if the display device has a digital output, electronic components are needed to convert the analog signal to a digital signal. With the advent of digital delivery mediums, such as ATSC (Advanced Television Systems Committee) signals, and of digital storage mediums and DVDs, multimedia can be delivered and stored using pure digital signals. Digital signals typically contain compressed frames of video.

In a network-based media environment, video items in the form of digital signals are sent from a video server to a display device over a network. The video server stores the video items for transmission over the network to the display device. The video items are often compressed before transmitting to reduce the bandwidth necessary for transmitting the video items. The display device receives the video items via the network and plays the media contents on the display device. More than one display devices are often coupled to the network to enable multiple display devices to play the same or different video items transmitted from the same video server.

While viewing the video item on the display device, a user may want to view the video items in trick modes (e.g., fast-forward or fast rewind) to search the video items or return to previously viewed scenes. Performing such trick modes in the network-based video system may be limited by the available bandwidth of the network. To perform double speed (2×) fast-forwarding operation, for example, the video server must send the video item to the display device over the network at double the normal speed so that the display device may receive, decode and display the video item at double the normal speed. As the speed of fast-rewind play increases, the data transmitted over the network must be increased accordingly. Therefore, the trick mode significantly increases the bandwidths of the network used for transmitting the video item.

Therefore, the present art lacks systems and methods that allow trick modes to be performed on a network-based video system without increasing the bandwidth for transmitting a video item over a network.

SUMMARY

Embodiments disclosed provide systems and methods for performing trick modes on video streams transmitted over a network without increasing the data transmitted over the network. In one embodiment, a video server transrates a source video stream to a target video stream by removing pictures from the source video stream. The target video stream has a reduced number of pictures or a modified sequence of pictures in the target video stream. Therefore, when the target video stream is played on a display device, the images are displayed at a speed faster than the playback speed of the source video stream or in a reverse order with respect to the source video stream.

In one embodiment, the video server transrates the source video stream into the target video stream in accordance with a trick-mode command received from the display device. The trick-mode command may be transmitted from the display device to the video server over the network in the form of packets.

In one embodiment, the target video stream includes predictive-coded pictures (P-pictures) or bidirectionally-predictive coded pictures (B-pictures) or both in addition to intra-coded pictures (I-pictures). By using the P-pictures or B-pictures or both in addition to the I-pictures, the video streams in the trick mode are played back more smoothly with less jitter compared to using only the I-pictures.

In one embodiment, the pictures of the source video stream are dropped to generate the target video stream for a fast-forward trick mode. The remaining pictures are reconfigured to remove dependency from the dropped pictures, and to include modified motion vectors. The types of picture may be reclassified in the target video stream to accommodate such elimination of certain pictures from the source video stream.

The features and advantages described in the specification are not all inclusive and, in particular, many additional features and advantages will be apparent to one of ordinary skill in the art in view of the drawings, specifications, and claims. Moreover, the language used in the specification has been principally selected for readability and instructional purposes and are not necessarily selected to delineate or circumscribe the inventive matter.

BRIEF DESCRIPTION OF THE DRAWINGS

Embodiments disclosed can be readily understood by considering the following detailed description in conjunction with the accompanying drawings.

FIG. 5 is a block diagram illustrating a network processing unit, according to one embodiment.

DETAILED DESCRIPTION

In the embodiments disclosed, trick modes (e.g., fast forward and fast rewind) are implemented by transrating a source video stream into a target video stream for transmission over a network to a display device. The pictures of the source video stream are dropped or the sequence of the pictures is modified to generate the target video stream. The target video stream is decoded and played back at the display device in the same manner as the source video stream. Therefore, images of the target video stream are displayed at the display device in a fast-forward trick mode or a rewind-play trick mode. The amount of data sent over the network to the display device is not changed by activation of the trick-mode.

A video server is a component of a network-based video system. The video server communicates with a display device over the network to transmit video streams. The video server includes a media processing unit for processing video streams either stored on the video server or received from a media source. The video server may be a general purpose computing device capable of performing various types of operations including transmission of the video streams over the network. Alternatively, the video server may be a dedicated device designed and operating mainly for the purpose of transmitting the video streams over the network.

The display device is any device capable of displaying video streams received from various media sources including the video server. The display device may receive inputs from a user indicating the trick modes to be activated on the display device. The display device may also decode a video stream received from the video server. The display device includes, among other devices, a monitor, a television, a portable media player, a portable console, and a mobile phone.

The source video stream is a sequence of pictures that is provided by a media source. The source video stream may be in a compressed format consisting of pictures in a group of pictures (GOP) structure. The source video stream may include pictures that are intra-coded (I-pictures), predictive-coded (P-pictures), and bidirectionally-predictive-coded (B-pictures).

The target video stream is a sequence of pictures generated by modifying the source video stream. The target video stream when played back at the display device displays images that correspond to the images of the source video streams in a trick mode. The target video stream is generated from the source video stream by dropping pictures from the source video stream or reversing the sequence of the pictures in the source video stream.

Overview of Network-Based Video System

Figure 1:
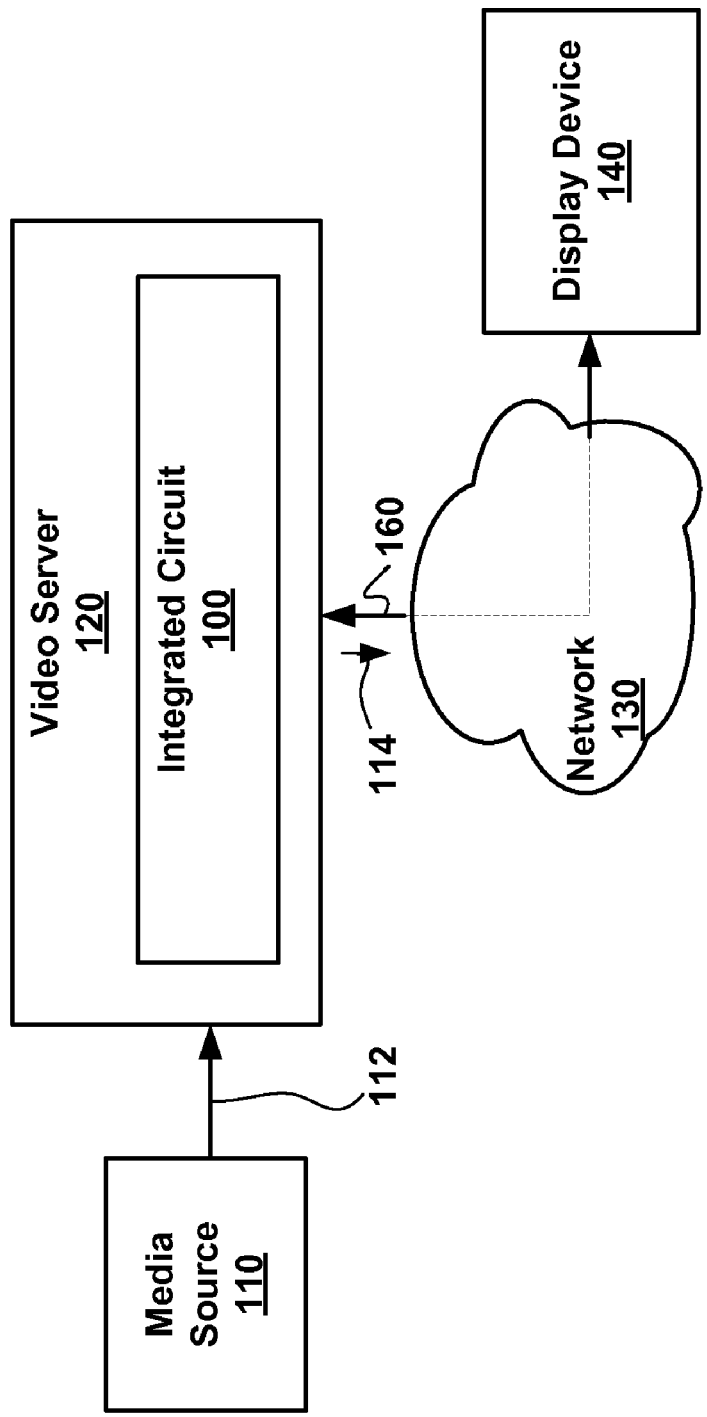
FIG. 1 is a schematic diagram illustrating a network-based video system, according to one embodiment.

FIG. 1 is a schematic diagram illustrating a network-based system for transmitting a video stream over a network 130, according to one embodiment. The network-based system comprises, among other components, a media source 110, a video server 120, and a display device 140. The video server 120 is connected to the media source 110 to receive a source video stream 112. The remote display device 140 communicates with the video server 120 via the network 130.

The source video stream 112 is transrated into the target video stream 114 by the video server 120. The target video stream 114 is then transmitted to the display device 140 via a network communication channel 160. In one embodiment, the video server 120 includes, among other components, an integrated circuit 100. The media source 110 (e.g., a DVD player or a set-top box) produces the source video stream 112 in a compression format for distribution by the video server 120 over the network 130. The media source 110 may be a part of the video server 120 such as a hard drive or other storage devices integrated with the video server 120. In one embodiment, the video server 120 produces the target video stream 114 that are packetized for transmission over the network 130.

The target video stream 114 transmitted over the remote display device 140 is a transrated version of the source video stream 112. In one embodiment, the target video stream 114 is essentially the same as the source video stream when a trick mode is not activated. In another embodiment, the target video stream 114 is a transcoded version of the source video stream 112. For example, the target video stream 114 may be a deinterlaced version of the source video stream 112, image enhanced version of the source video stream 112 or scaled version of the video stream 112 (e.g., 1080 lines scaled to 720 lines).

When the trick mode is activated, the target video stream 114 fed to the display device 140 contains fewer pictures or have pictures in a reverse sequence compared to the source video stream 112. Therefore, when the target video stream 114 is played on the remote display device 140, the images are played back on the display device 140 at a different speed of in a different direction compared to the source video stream 112.

In one embodiment, the video server 120 stores at least one media item. The video server 120 sends commands to the media source 110 to identify and retrieve a media item or a selected portion of the media item from the media source 110 in the form of the source video stream 112. Allowing the media source 110 to retrieve portions of the media item in a reverse order may be advantageous in implementing a rewind-play or a fast-rewind trick mode, as explained below with reference to FIG. 6C.

Video Server Structure

Figure 2:
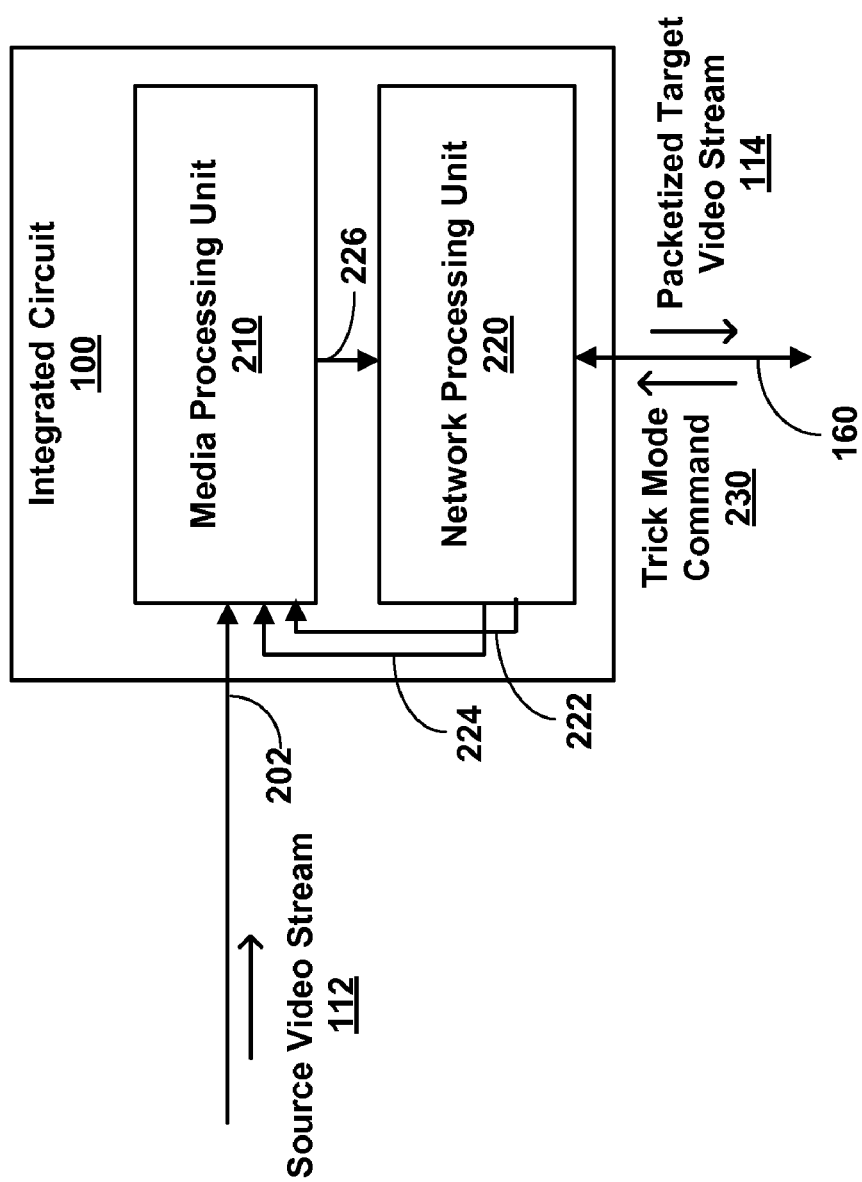
FIG. 2 is a block diagram illustrating an integrated circuit of a video server, according to one embodiment.

FIG. 2 is a block diagram of an integrated circuit 100 for processing the source video stream 112, according to one embodiment. Although the embodiment of FIG. 2 is described with reference to integrated circuit 100, other embodiments of the video server may be implemented, for example, across several integrated circuits or partially in software. Also, the integrated circuit 100 can be implemented on a silicon wafer or other suitable material. The integrated circuit 100 includes, among other components, a media processing unit 210 and a network processing unit 220. In one embodiment, the integrated circuit 100 is configured with multiple processing cores and the media and network processing units 210, 220, each unit operating from a dedicated core. The integrated circuit 100 can be part of, for example, a system for distributing video streams from a video server, as described above with reference to FIG. 1.

The media processing unit 210 receives the source video stream 112 from the media source 110. The media processing unit 210 also receives trick mode commands 230 from the remote display device 140 via the network processing module 220 and in response, sends the target video stream 226 to the network processing unit 220. The trick mode commands 230 (received from the remote display device 140) indicate the trick mode to be activated. The trick mode commands 230 may be prompted by a user input received at the display device 140.

The network processing unit 220, at a high-level, is configured to packetize the target video streams 226 and determine conditions associated with the network 130. The packetized target video stream 114 may comprise TCP/IP packets, UDP/IP packets, ATM packets, and the like. One embodiment of network processing unit 220 is described in further detail below with reference to FIG. 5.

Figure 3:
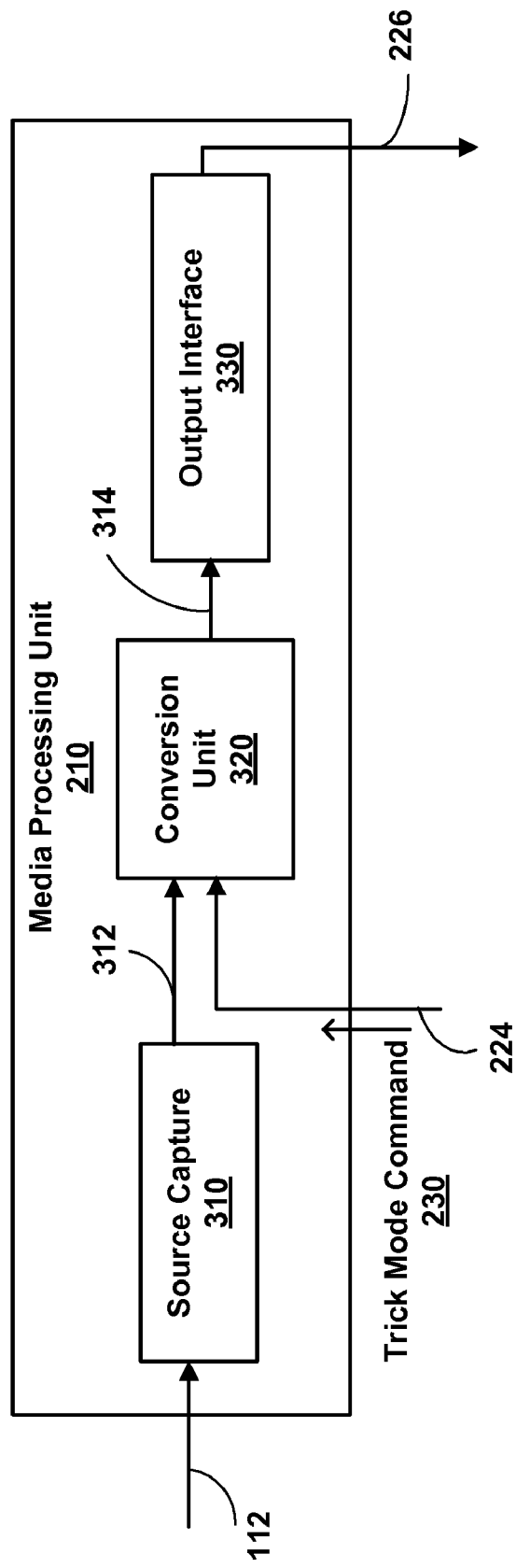
FIG. 3 is a block diagram illustrating a media processing unit of the integrated circuit, according to one embodiment.

FIG. 3 is a block diagram illustrating the media processing unit 210, according to one embodiment. The media processing unit 210 comprises a source capture 310, a conversion unit 320, and an output interface 330. The source capture 310 is coupled to the media source 110 to capture and a captured source video stream 312 to the conversion unit 320. The source capture 310 may temporarily buffer the source video stream 112. In some embodiments, the source capture 310 and the output interface 330 may also perform various functions such as color space conversion, sample rate conversion, demodulating, digitizing, decoding, decryption, and the like.

The output interface 330 is coupled to temporarily buffer and send the target video stream 314 to the network processing unit 220 via a line 226. In one embodiment, the output interface 330 may also provide functions such as an On Screen Display (OSD) overlay, Picture In Picture (PIP), and DVD subpicture overlay.

Figure 4A:
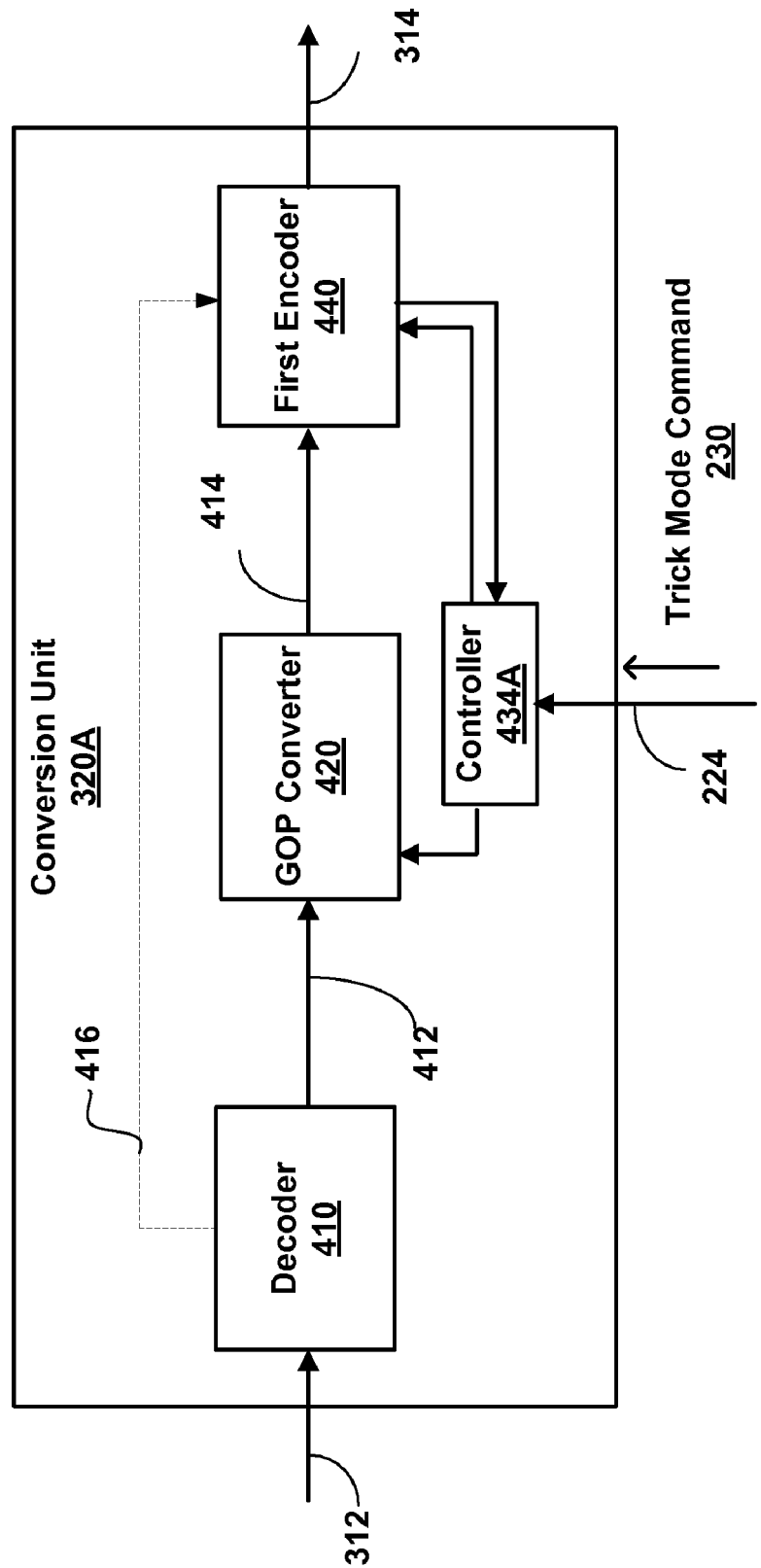
FIGS. 4A and 4B are block diagrams illustrating conversion units, according to embodiments.

FIG. 4A is a block diagram of the conversion unit 320A, according to one embodiment. The conversion unit 320A includes, among other components, a decoder 410, a GOP converter 420, a controller 434A, and a first encoder 440. The decoder 410 receives the captured source video stream 312 and decodes the captured source video stream into a noncompressed source video stream 412. The decoder may send the motion vectors 416 of the decoded pictures to the first encoder 440 for encoding a transrated video stream 414, as explained in detail below with reference to FIGS. 7A and 7B.

The GOP converter 420 transrates the noncompressed source video stream 412 into the transrated video stream 414 by dropping the pictures or reversing the sequence of pictures, as explained in detail below with reference to FIGS. 6A to 8. The number of pictures to be dropped is determined by the controller 434A in accordance with the trick mode command 230 received via the line 224. The transrated video stream 414 is fed to the first encoder 440 and compressed into the target video stream 314.

The controller 434A controls the operation of the GOP converter 420 and the first encoder 440 to generate the target video stream 314 in accordance with the trick mode command 230. In one embodiment, the controller 434A controls further considers the network condition of the network 130 in determining the number of pictures to be dropped or encoding method to be used by the first encoder 440.

Figure 4B:
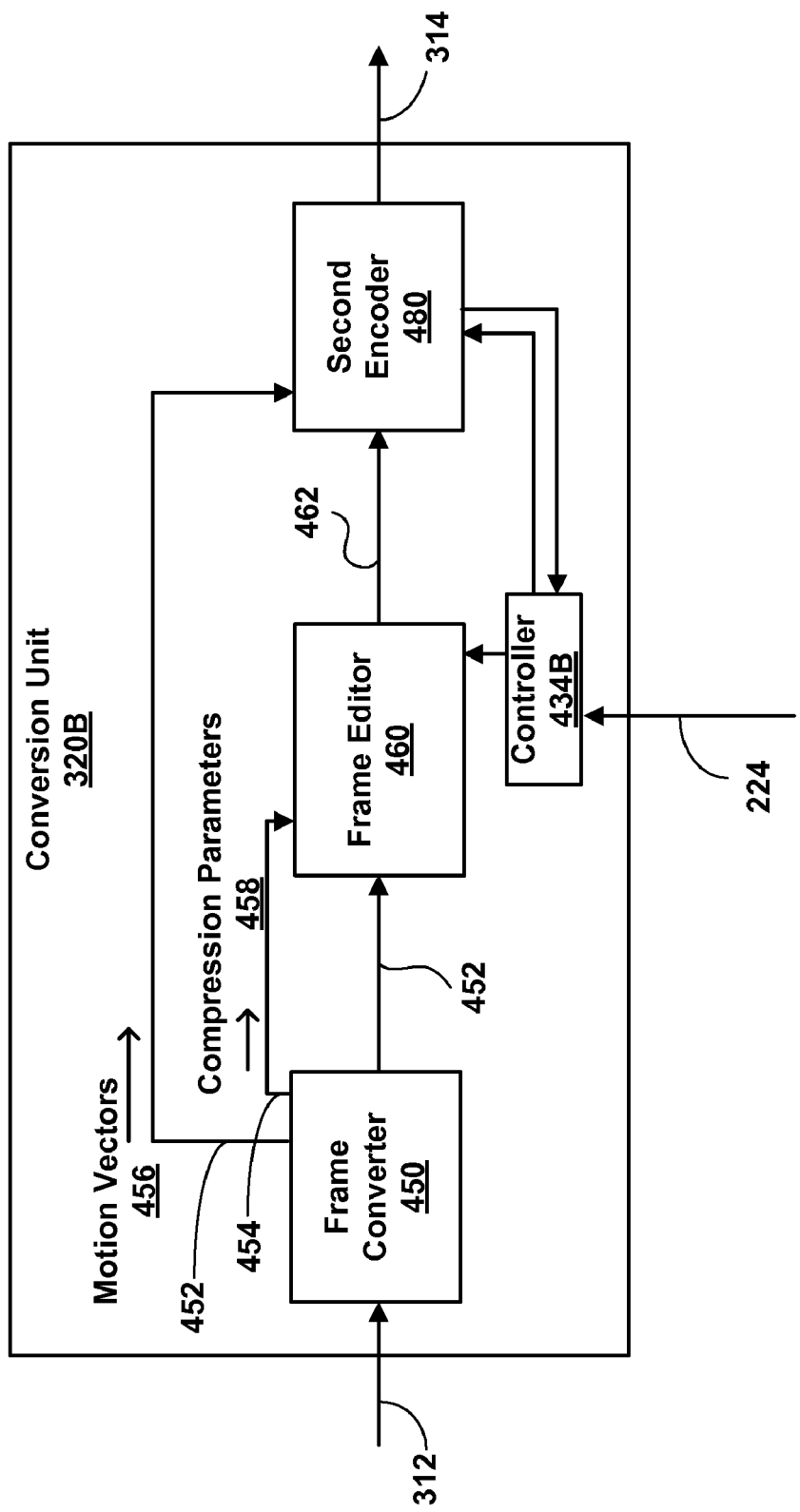

FIG. 4B is a block diagram of the conversion unit 320B, according to another embodiment. One of the differences between the conversion unit 320A of FIG. 4A and the conversion unit 320B of FIG. 4B is that the conversion unit 320A fully decodes and decompresses the captured source video stream 312 whereas the conversion unit 320B processes the captured source stream 312 within the compressed domain. Because the captured source video stream 312 is not fully decompressed, the overall process of the conversion unit 320B may be faster and more efficient than the conversion unit 320A.

The conversion unit 320B includes, among other components, a frame converter 450, a frame editor 460, a second encoder 480, and a controller 434B. The frame converter 450 converts the captured source video stream 312 into an intermediate video stream 452 in an intermediary compression format. In one embodiment, the intermediary compression format includes pictures that are intra-picture compressed but not inter-picture compressed. That is, the intermediate video stream 452 includes pictures that are similar to the Intra-coded picture (I-picture) in MPEG-2 or H.264 format. The intermediary compression format describes pictures in a compressed domain, rather than the spatial domain, thereby allowing more efficient operations and significantly less memory usage. The frame converter 450 extracts compression information such as motion vectors 456 and compression parameters 458 and feeds the compression information to the frame editor 460 and the second encoder 480.

The intermediate video stream 452, the motion vectors 456 between the pictures of the intermediate video stream 452, and the compression parameters 458 of the intermediate video stream 452 are fed to the frame editor 460. The frame editor 460 drops the pictures of the intermediate video stream 452 or reverses the sequence of the pictures according to the instructions from the controller 434B to obtain an intermediate target video stream 462, as explained below in detail with reference to FIGS. 6A to 8.

The intermediate target video stream 462 and the motion vectors 456 are then provided to the second encoder 480. The second encoder 480 compresses the intermediate converted video stream 462 into the compressed target video stream in accordance with the instructions from the controller 434B. In one embodiment, the second encoder 480 selects an appropriate conversion table and mechanism for mapping the intermediary compression format to the compression format of the target video stream 314.

Like the controller 434A, the controller 434B may consider the network condition of the network 130 in determining the number of pictures to be dropped in the frame editor 460 and the encoding method to be used in the second encoder 480.

FIG. 5 is a block diagram illustrating the network processing unit 220 of integrated circuit 100 in further detail. The network processing unit 220 comprises, among other components, a network conditions detector 510, a packetizer 520, a network interface 530, and a depacketizer 540. The specific couplings of the components illustrated in FIG. 5 are merely illustrative, and alternative configurations are possible.

The network conditions detector 510 sends probe packets and receives response data packets via the network interface 530 to actively test various network conditions.

The packetizer 520 receives compressed output stream 226 and outputs packetized target stream 522. In one embodiment, the packetizer 520 embeds compressed output stream 226 into a format appropriate for the medium (e.g., TCP/IP packets for a LAN) to generate packetized target stream 114. In another embodiment, the packetizer 520 may make adjustments responsive to network conditions received from the network conditions detector 510.

The depacketizer 540 unpacks the packetized information received from the display device 140 via the network interface 530. The packetized information from the display device 140 includes, among other information, trick mode commands 230 instructing the trick mode to be activated.

The network interface 530 sends and receives physical signals (e.g., electrical or electro magnetic signals) via the communication channel 160. The network interface 530 may be, for example, a radio transceiver (i.e., for wireless connections) or an Ethernet NIC (Network Interface Card) card.

Conversion of Source Video Stream to Target Video Stream

Figure 6A:
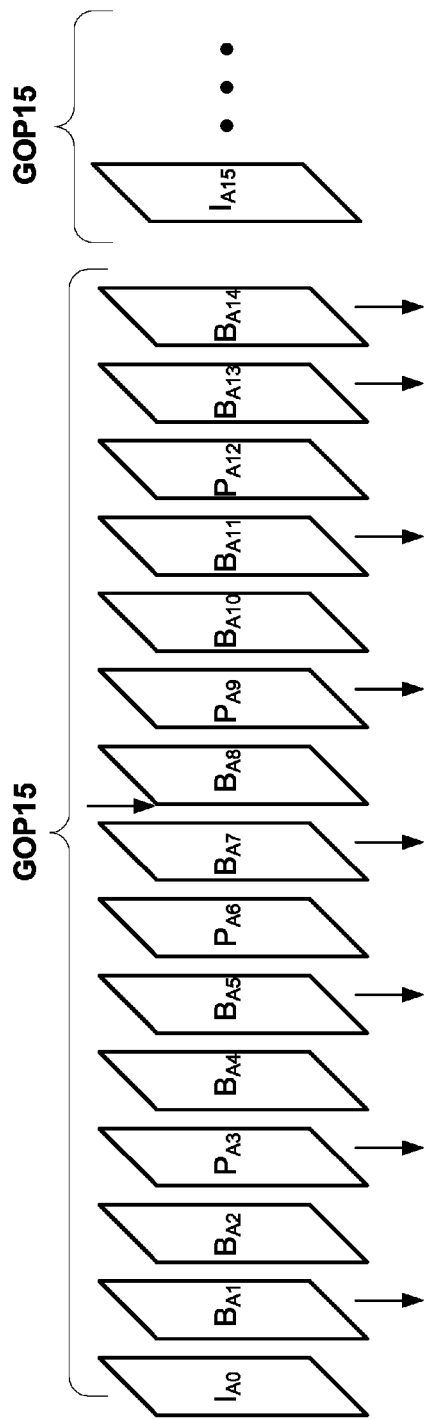
FIG. 6A is a diagram illustrating a group of pictures in a source video stream, according to one embodiment.

FIG. 6A is a diagram illustrating a group of pictures (GOP) in the source video stream 312, according to one embodiment. In this example, the group of pictures (GOP15) of the source video stream comprises fifteen (15) pictures. The order of the pictures in the bitstream of the source video stream may, for example, be $I_{A0}, B_{A1}, B_{A2}, P_{A3}, B_{A4}, B_{A5}, P_{A6}, B_{A7}, B_{A8}, P_{A9}, B_{A10}, B_{A11}, P_{A12}, B_{A13},$ and $B_{A14}$, as illustrated in FIG. 6A. "I" indicates intra-coded pictures (I-pictures), "P" indicates predictive-coded pictures (P-pictures), and "B" indicates bidirectionally-predictive-coded pictures (B-pictures). The P pictures (i.e., $P_{A3}, P_{A6}, P_{A9},$ and $P_{A12}$) are predicted from I-picture $I_{A0}$. The B-pictures are then predicted from the I-pictures and/or P-pictures. I-picture $I_{A15}$ follows picture $B_{A14}$ as the first picture in the next GOP.

Responsive to receiving the trick mode command 230 to fast-forward the video in double (2×) speed at the video server 120, the pictures in the group of pictures indicated by arrows are dropped to generate the target video stream 314. Specifically, pictures $B_{A1}, P_{A3}, B_{A5}, B_{A7}, P_{A9}, B_{A11}, P_{A13}$ and $B_{A14}$ are dropped by the GOP converter 420 or the frame editor 460 to obtain the transrated video stream 414 or the intermediate target video stream 462, which are encoded into the target video stream 314. The target video stream 314 formatted for the fast-forward trick mode in this manner shows less jitter compared to a coarse fast-forward trick mode using only I-pictures of the source video stream 312. Another advantage of implementing the trick mode in this manner is that the trick mode can implement various fast-forward speeds because the number of pictures to be dropped from the group of pictures can be changed arbitrarily.

Figure 6B:
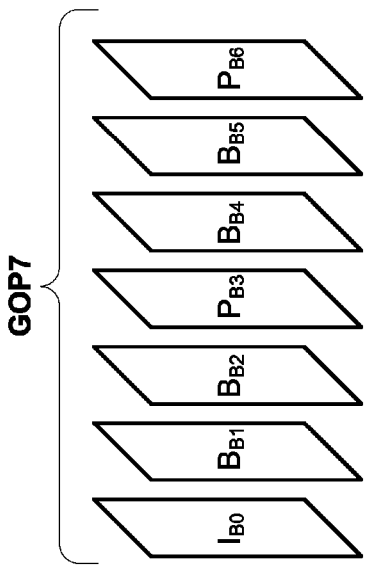
FIG. 6B is a diagram illustrating a group of pictures in a target video stream for a fast-forward trick mode, according to one embodiment.

FIG. 6B is a diagram illustrating a group of pictures (GOP7) in a target video stream 314 generated by dropping the pictures indicated by arrows in FIG. 6A. The group of pictures (GOP7) illustrated in FIG. 6B includes seven (7) pictures: $I_{B0}, B_{B1}, B_{B2}, P_{B3}, B_{B4}, B_{B5},$ and $P_{B6}$ (corresponding to $I_{A0}, B_{A2}, B_{A4}, P_{A6}, B_{A8}, B_{A10},$ and $P_{A12}$ of FIG. 6A, respectively). Because the group of pictures in the target video stream 314 as illustrated in FIG. 6B includes approximately half the number of pictures in the group of pictures in the source video stream, the target video stream 314 will be played back at approximately double the speed of the source video stream 312 at the display device 140.

In the example of FIGS. 6A and 6B, the pictures not dropped from the source video stream 312 are maintained as the same type of pictures (I-picture, P-picture, and B-picture) in the target video stream 314. The type of pictures, however, need not be maintained; and the types of pictures may be reclassified during the conversion. Also, the motion vectors of the pictures to be encoded by the first encoder 440 or the second encoder 480 may need to be adjusted, as explained below in detail with reference to FIGS. 7A and 7B because certain pictures are dropped.

More or less number of pictures may be dropped depending on the trick mode being activated. Also, different pictures may be dropped to implement the trick mode. For example, frame $B_{A2}$ may be dropped instead of frame $B_{A1}$.

Figure 6C:
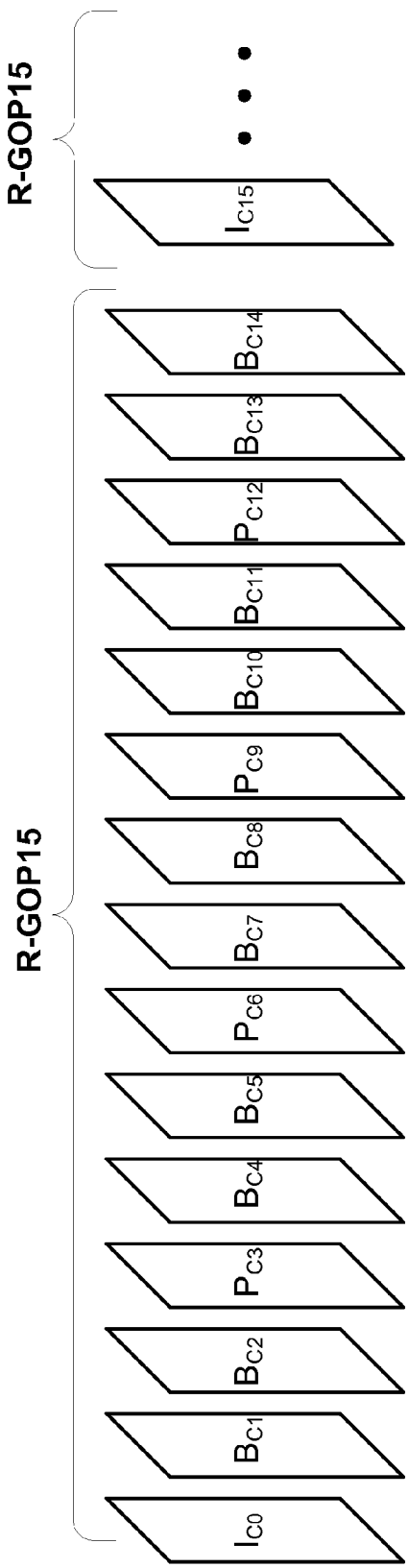
FIG. 6C is a diagram illustrating a group of pictures in a target stream for a rewind-play trick mode, according to one embodiment.

FIG. 6C is a diagram illustrating a group of pictures (R-GOP15) modified to implement a rewind-play mode, according to one embodiment. In one embodiment, the GOP converter 420 or the frame editor 460 reverses the order of the group of pictures responsive to receiving the trick mode indicating the rewind playback. The order of pictures in the GOP15 is reversed and reclassified into a reverse ordered group of pictures (R-GOP15). Specifically, $I_{A0}, B_{A1}, B_{A2}, P_{A3}, B_{A4}, B_{A5}, P_{A6}, B_{A7}, B_{A8}, P_{A9}, B_{A10}, B_{A11}, P_{A12}, B_{A13}, B_{A14},$ and $I_{A15}$ of FIG. 6A are reversed in order and reclassified into $I_{C0}, B_{C1}, B_{C2}, P_{C3}, B_{C4}, B_{C5}, P_{C6}, B_{C7}, B_{C8}, P_{C9}, B_{C10}, B_{C11}, P_{C12}, B_{C13}, B_{C14},$ and $I_{C15}$ of FIG. 6C. Therefore, $I_{C0}, B_{C1}, B_{C2}, P_{C3}, B_{C4}, B_{C5}, P_{C6}, B_{C7}, B_{C8}, P_{C9}, B_{C10}, B_{C11}, P_{C12}, B_{C13}, B_{C14},$ and $I_{C15}$ corresponds to $I_{A15}, B_{A14}, B_{A13}, P_{A12}, B_{A11}, B_{A10}, P_{A9}, B_{A8}, B_{A7}, P_{A6}, B_{A5}, B_{A4}, P_{A3}, B_{A2}, B_{A1},$ and $I_{A0}$, respectively. Picture $I_{C15}$ follows as the first picture of the next reversed ordered group of pictures.

In order to transcode the source video stream 112 in a reverse direction, the order of the pictures needs to be reversed by the GOP Converter 420. As pictures are decoded by the decoder 410, the GOP converter 420 puts the pictures in a cache until the entire GOP is decoded. The GOP converter 420 then processes the pictures in reverse order fixing the motion vectors to point correctly before passing them to the first encoder 440.

In a fast-rewind mode, pictures may be dropped from the group of pictures rearranged in a reverse sequence. By adjusting the number of pictures to be dropped, the speed of the rewind playback at the display device 140 may be adjusted.

In the example illustrated in FIG. 6C, the target video stream 314 includes all the pictures of the source video streams 312 in reverse order. Therefore, the rewind play mode implemented by rearranging the group of pictures has the benefit of showing images that are not jittery. It is also possible to select arbitrary rewind speed by changing the number of pictures to be dropped.

The decoder 410 of the conversion unit 320A as illustrated in FIG. 4A decompresses the pictures of the source video stream 312. After processing the source video stream 312 by the GOP converter 420, the first encoder 440 encodes the pictures remaining in the transrated video stream 414. The encoding process includes, among others processes, the process of determining motion vectors for the macroblocks by motion estimation. The motion estimation processes, however, may take significant amount of time and computation. Therefore, it is advantageous to use the motion vector obtained by the decoder 410 during the decoding process. In one embodiment, the first encoder 440 receives the motion vectors 416 obtained from the decoder 410 during the decoding process and uses the motion vectors 416 to generate the target video stream 314. Note that the motion vectors 416 may be processed by the GOP converter 420 before being passed to the first encoder 440.

Figure 7A:
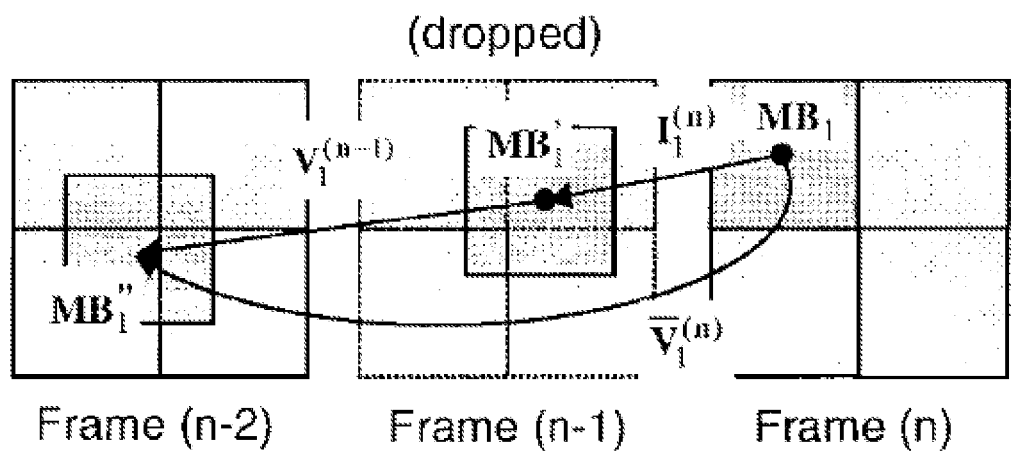
FIG. 7A is a diagram illustrating generation of a motion vector when a picture is dropped, according to one embodiment.

FIG. 7A is a diagram illustrating generating of a motion vector of frame (n) based on the motion vectors 416 received from the decoder 410 after dropping frame (n-1). Because frame (n-1) is dropped and unavailable, the motion vector $I_1(n)$ referencing frame (n-1) may not be used for generating the compressed target video stream 314. A new motion vector $\overline{V_1^{(n)}}$ referencing the remaining frame (n-2) must be generated.

Figure 7B:
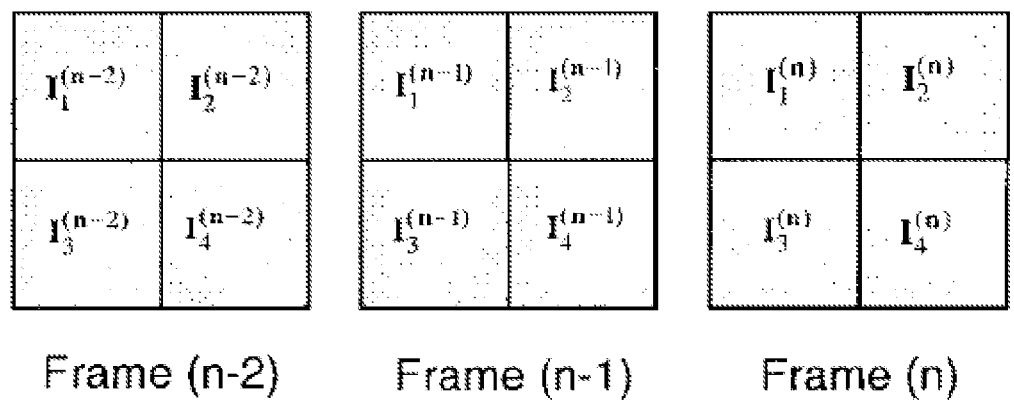
FIG. 7B is a diagram illustrating motion vectors of the macroblocks in the pictures of FIG. 7A, according to one embodiment.

The motion vector $\overline{V_1^{(n)}}$ may be generated by using the methods described, for example, in Jeongnam Youn et al., "Motion Vector Refinement for High-Performance Transcoding," IEEE Transactions on Multimedia, Vol. 1, No. 1, March 1999, pp. 30-40, which is incorporated herein by reference in its entirety. Referring to FIG. 7B, $I_1^{(n-2)}, I_2^{(n-2)}, I_3^{(n-2)}$ and $I_4^{(n-2)}$ indicate the motion vectors for the macroblocks of frame (n-2). $I_1^{(n-1)}, I_2^{(n-1)}, I_3^{(n-1)}$ and $I_4^{(n-1)}$ indicate the motion vectors for the macroblocks of frame (n-1). $I_1^{(n)}, I_2^{(n)}, I_3^{(n)}$ and $I_4^{(n)}$ indicate the motion vectors for the macroblocks of frame (n). In one embodiment, $I_1^{(n-1)}, I_2^{(n-1)}, I_3^{(n-1)}$ and $I_4^{(n-1)}$ are bilinear interpolated to obtain an approximation of the motion vector $V_1^{(n-1)}$. By adding the motion vector $I_1^{(n)}$ with the motion vector $V_1^{(n-1)}$, an estimation of the motion vector $\overline{V_1^{(n)}}$ for macroblock $MB_1$ may be obtained. The estimated motion vector $\overline{V_1^{(n)}}$ may be used by the first encoder 440 as the motion vector to encode frame (n) based on frame (n-2).

In another embodiment, a forward dominant vector selection (FDVS) method is used to obtain the motion vector $V_1^{(n-1)}$ and $\overline{V_1^{(n)}}$. The FDVS method selects one dominant motion vector from the four neighboring macroblocks. The dominant motion vector is defined as the motion vector carried by a dominant macroblock. The dominant macroblock is a macroblock that has the largest overlapping segment with the block pointed by the motion vector. For example, in FIG. 7A, the upper right macroblock of the frame (n-1) is the dominant macroblock for macroblock $MB_1'$. Therefore, for $MB_1'$, the motion vector $V_1^{(n-1)}$ corresponds to $I_2^{(n-1)}$. By adding the motion vector $I_1^{(n)}$ with the motion vector $V_1^{(n-1)}$, an estimation of the motion vector $\overline{V_1^{(n)}}$ for macroblock $MB_1$ may be obtained. The estimated motion vector $\overline{V_1^{(n)}}$ may be used by the first encoder 440 as the motion vector to encode the frame (n) based on the frame (n-2).

Figure 8:
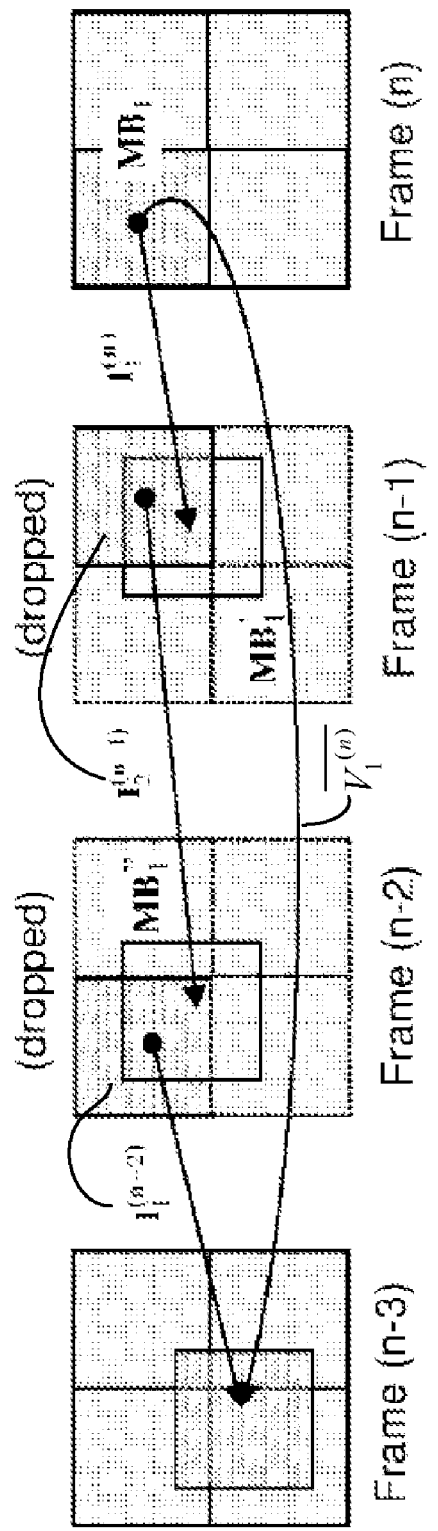
FIG. 8 is a diagram illustrating generating of a motion vector when two consecutive pictures are dropped, according to one embodiment.

FIG. 8 illustrates estimating the motion vector of a picture in the source video stream when two consecutive pictures (frame (n-2) and frame (n-1)) preceding frame (n) are dropped from the source video stream 312. The motion vectors of the dropped frame (n-2) and frame (n-1) are retrieved to determine the motion vector $\overline{V_1^{(n)}}$ for macroblock $MB_1$. Specifically, the dominant motion vector $I_1^{(n)}$ for frame (n) is added to the dominant motion vector $I_2(n-1)$ for frame (n-1) and $I_1(n-2)$ for frame (n-2) to obtain an estimation of the motion vector $\overline{V_1^{(n)}}$. The estimated motion vector $\overline{V_1^{(n)}}$ may then be used during the encoding of frame (n) to compress frame (n) without performing the motion estimation.

Although FIGS. 7A to 8 are described above as being performed by the conversion unit 320A illustrated in FIG. 4A, the same process or method can also be used by the conversion unit 320B illustrated in FIG. 4B. Specifically, the frame converter 450 extracts the motion vectors 456 for the pictures of the captured source video stream 312 and sends the motion vector 456 to the second encoder 480. The second encoder 480 may then use the motion vector 458 to estimate the motion vector $\overline{V_1^{(n)}}$ for generating the target video stream 314.

Method of Implementing Trick Mode

Figure 9:
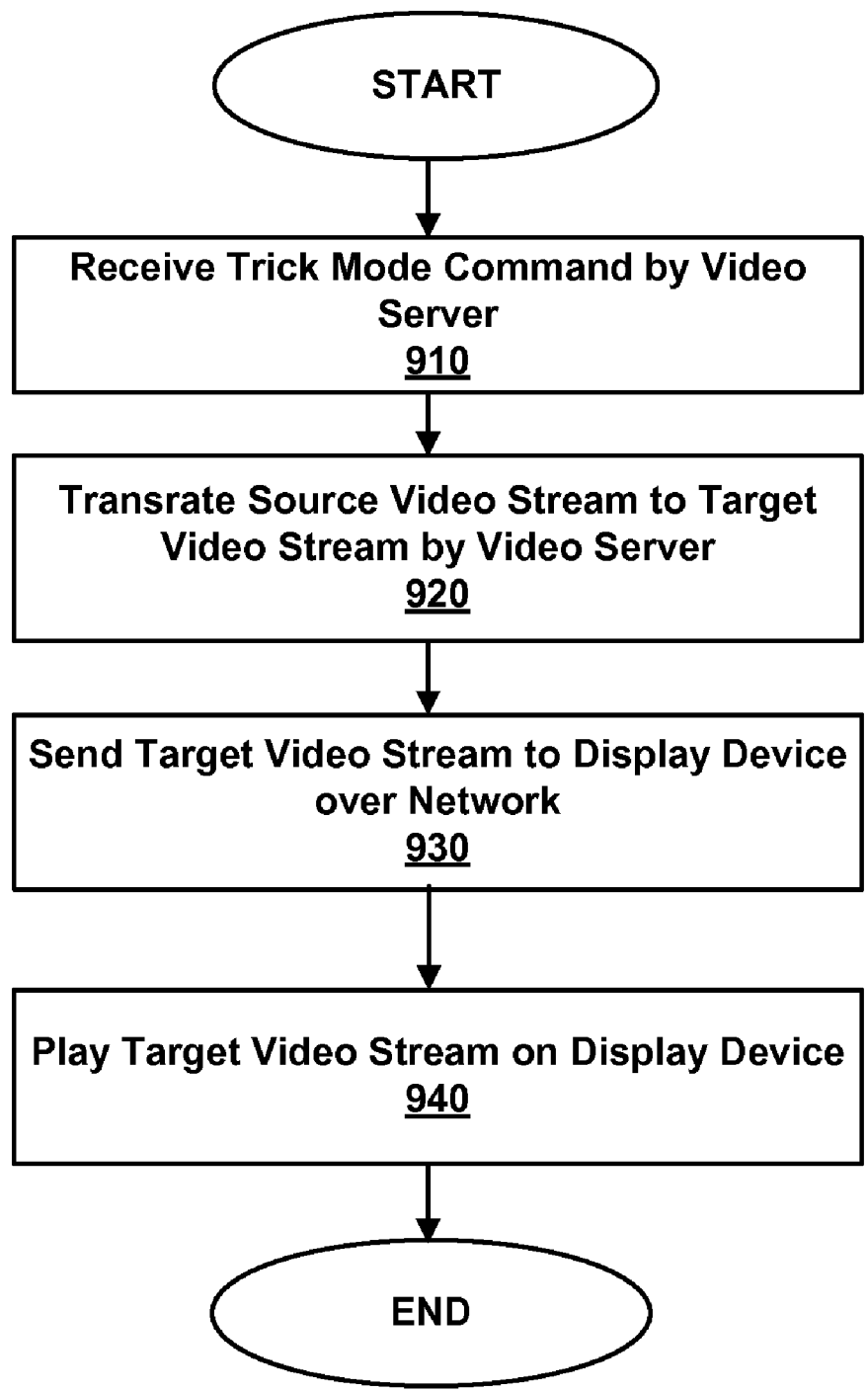
FIG. 9 is a flowchart illustrating a method of performing a trick mode for a video stream transmitted over a network, according to one embodiment.

FIG. 9 is a flow chart illustrating a method of performing a trick mode for a video stream transmitted over a network, according to one embodiment. The video server 120 receives 910 the trick mode command 230 sent by the display device 140 over the network 130 in the form of packets. The network processing unit 220 extracts the trick mode command 230 from the packets and relays the trick mode command 230 to the media processing unit 210.

The media processing unit 210 then converts 920 the source video stream 312 into the target video stream 314, as explained above in detail with reference to FIGS. 6A to 8. Specifically, the GOP converter 420 or the frame editor 460 drops pictures of the source video stream 312 or reverses the order of the pictures before encoding the video streams 414, 462 by the first encoder 440 or the second encoder 480. The pictures to be dropped are selected by the controller 434A or the controller 434B in accordance with the trick mode command 230.

The target video stream 314 generated by the conversion unit 320A or the conversion unit 320B is sent 930 from the video server 120 to the display device 140 over the network 130. Specifically, the target video stream 314 is packetized into multiple packets by the network processing unit 220. Then the packets are sent to the display device 140 via the network 130. Because the target video stream 314 is already reformatted by the video server 120 to remove certain pictures, the bandwidth required for transmitting the packetized target video stream 114 over the network 130 remains approximately the same even when the trick mode is activated.

After the packetized target video stream 114 is received at the display device 140, the packetized target video stream 114 is depacketized. Then the target video stream is played 940 on the display device 140. Although the display device 140 decodes and plays back the target video stream at a normal speed, the images displayed on the display device 140 can be fast-forward, rewind-play, or fast-rewind version of the source video stream 112 because the target video stream 314 is reformatted accordingly.

Figure 10:
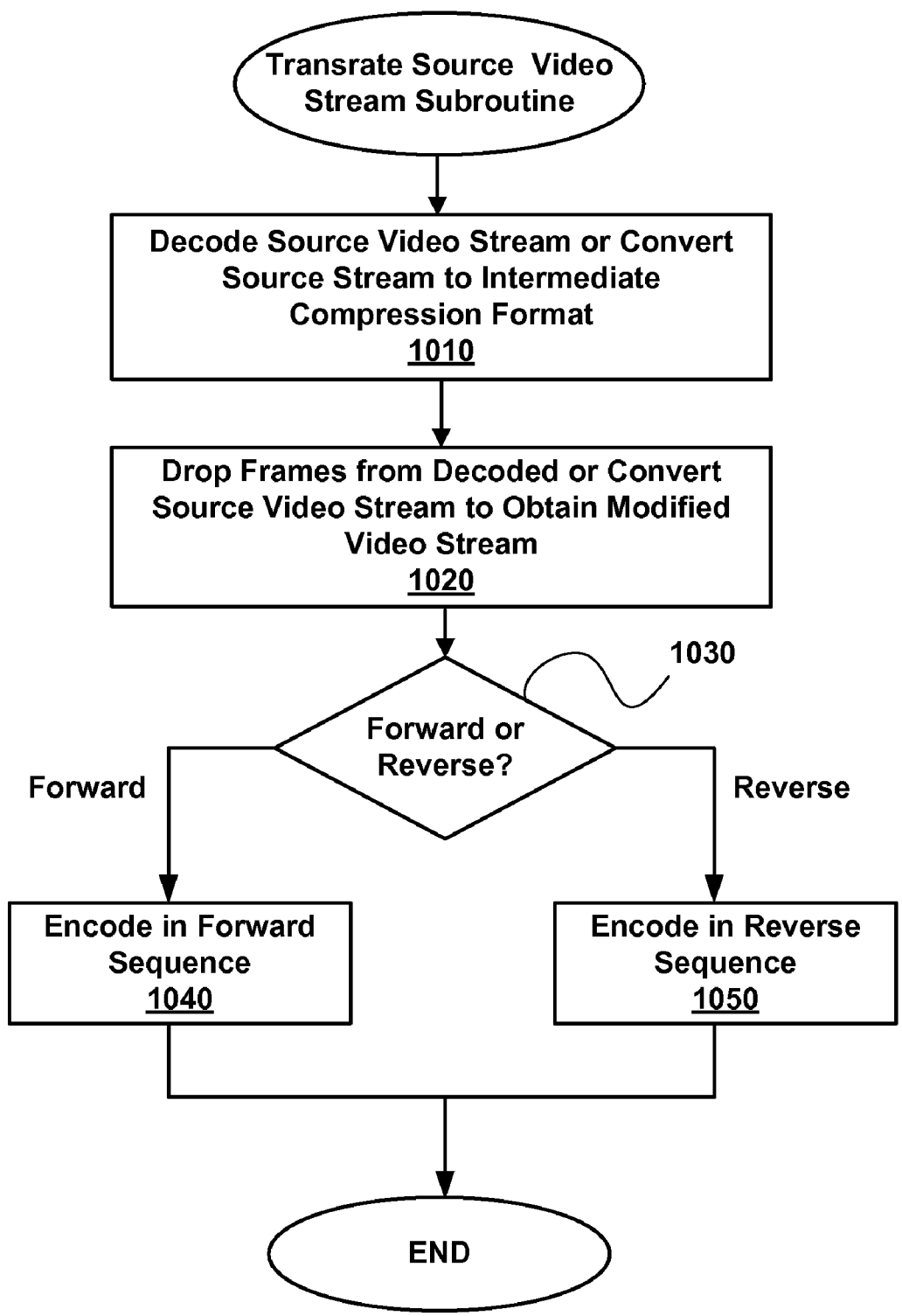
FIG. 10 is a flowchart illustrating a method for transrating a source video stream to a target video stream, according to one embodiment.

FIG. 10 is a flowchart illustrating the method of transrating the source video stream 112 into the target video stream 314, according to one embodiment. The source video stream 112 is decoded or converted 1010 into uncompressed format or an intermediate compression format. The pictures of the decoded or converted source video stream may then be dropped 1020 if the trick mode command 230 from the display device 140 indicates activation of the fast-forward or fast-rewind trick mode. If the trick mode command 230 from the display device 140 indicates a rewind-play mode, then the pictures are not dropped from the source video stream 112.

It is then determined 1030 whether the trick mode command indicates activation of the fast-forward mode or rewind-play mode. If the fast-forward mode is activated, then the modified video stream is encoded 1040 in a forward sequence. In contrast, if the rewind-play mode is activated, the modified video stream is decoded 1050 in the reverse sequence. Instead of first dropping the pictures and then encoding the modified video stream in a forward or reverse sequence, it is also possible to first decode the source video stream in forward or reverse sequence and then drop the pictures.

ALTERNATIVE EMBODIMENTS

In one embodiment, a slow-motion mode is implemented by inserting duplicative pictures into the source video stream 112. The video stream including the duplicative pictures is then encoded into the target video stream 314. The target video stream 314 with the duplicative pictures is sent over the network 130 to the display device 140 to display the source video stream 112 in the slow-motion mode.

The order in which the steps of the methods of the present disclosure are performed is purely illustrative in nature. The steps can be performed in any order or in parallel, unless otherwise indicated by the present disclosure. The disclosed embodiments may be performed in hardware, firmware, software, or any combination thereof operating on a single computer or multiple computers of any type. Software implementing the embodiments may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

All of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

In the embodiments disclosed, trick modes are implemented by transrating a source video stream into a target video stream, and transmitting the target video stream over a network for playback at a display device. The bandwidth needed for transmitting the target video stream is not increased substantially even when the fast-forward of fast-rewind trick mode is activated because the operations associated with the trick mode is performed at the video server, and the display device is delegated to displaying the target video stream provided by the video server over the web. Therefore, the embodiments disclosed use the network resources efficiently during the activation of the trick modes. Another advantage of the disclosed embodiment is that the structure or functionality of the display device may be simplified because the display device need not include components for implementing the trick mode other than the components for sending the trick mode commands to the video server.

Upon reading this disclosure, those of skill in the art will appreciate still additional alternative structural and functional designs for a system and a process for performing trick mode for video stream transmitted over network. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method and apparatus of the embodiments disclosed herein without departing from the spirit and scope as defined in the appended claims.

What is claimed is:

1. An integrated circuit for transmitting a video stream over a network to a display device, comprising:
a media processing unit configured to convert a source video stream into a target video stream in accordance with a command received from the display device, the media processing unit comprising:
a frame converter configured to convert the source video stream into an intermediate video stream in a compressed format, wherein pictures of the intermediate video stream are intra-frame compressed but not inter-frame compressed, the frame converter further configured to extract motion vectors of the source video stream;
a frame editor coupled to the frame converter, the frame editor configured to drop pictures of the intermediate video stream or modify a sequence of pictures of the intermediate video stream to generate a modified video stream; and
an encoder coupled to the frame converter and the frame editor, the encoder configured to encode the modified video stream and generate the target video stream using the extracted motion vectors; and
a network processing unit coupled to the media processing unit, the network configured to send the target video stream to the display device via the network and receive the command from the display device via the network.

2. The integrated circuit of claim 1, wherein the frame editor is configured to modify a Group of Pictures (GOP) structure in the intermediate video stream by dropping the pictures.

3. The integrated circuit of claim 1, wherein the network processing unit comprises:
a packetizer configured to packetize the target video stream into first packets for transmission to the display device over the network;
a depacketizer configured to depacketize second packets received from the display device, the second packets including the command; and
a network interface coupled to the packetizer and the depacketizer, the network interface configured to send the first packets to the display device and receive the second packets from the display device over the network.

4. The integrated circuit of claim 1, wherein the source video stream comprises intra-coded pictures (I-pictures), predictive-coded pictures (P-pictures), and bidirectionally-predictive-coded pictures (B-pictures); and the target video stream comprises the P-pictures or the B-pictures or both in addition to the I-pictures.

5. The integrated circuit of claim 1, wherein the frame editor is further configured to reclassify types of pictures remaining after dropping pictures to generate the modified video stream.

6. The integrated circuit of claim 1, wherein the frame editor is configured to change a number of pictures dropped based on the command.

7. A method of converting a video stream to play the video stream at a different playback speed or direction at a display device, the method comprising:
at a video server, receiving a command from the display device over a network, the command indicative of the playback speed and direction at the display device;
converting a source video stream into an intermediate video stream in a compressed format, wherein pictures of the intermediate video stream are intra-frame compressed but not inter-frame compressed;
extracting motion vectors of the source video stream;

dropping pictures of the intermediate video stream or modifying a sequence of pictures of the intermediate video stream to generate a modified video stream based on the command;

encoding the modified video stream to generate the target video stream using the extracted motion vectors; and sending the target video stream from the video server to the display device over the network.

8. The method of claim 7, wherein dropping the pictures or modifying the sequence comprises modifying a Group of Pictures (GOP) structure in the intermediate video stream.

9. The method of claim 7, wherein sending the target video stream comprises:

at the video server, packetizing the target video stream into packets; and sending the packets from the video server to the display device over the network.

10. The method of claim 7, wherein the source video stream comprises intra-coded pictures (I-pictures), predictive-coded pictures (P-pictures), and bidirectionally-predictive-coded pictures (B-pictures); and the target video stream comprises the P-pictures or the B-pictures or both in addition to the I-pictures.

11. The method of claim 7, further comprising reclassifying types of pictures remaining after dropping pictures to generate the modified video stream.

12. The method of claim 7, further comprising changing a number of pictures dropped based on the command.

13. A system for converting a source video stream for transport over a network to a display device, the system comprising:

a media processing unit configured to convert the source video stream into a target video stream in accordance with a command received from the display device, the media processing unit comprising processor and further comprising:

a frame converter configured to convert the source video stream into an intermediate video stream in a compressed format, wherein pictures of the intermediate video stream are intra-frame compressed but not inter-frame compressed, the frame converter further configured to extract motion vectors of the source video stream;

a frame editor coupled to the frame converter, the frame editor configured to drop pictures of the intermediate video stream or modify a sequence of pictures of the intermediate video stream to generate a modified video stream; and an encoder coupled to the frame converter and the frame editor, the encoder configured to encode the modified video stream and generate the target video stream using the extracted motion vectors; and a network processing unit coupled to the media processing unit, the network configure to send the target video stream to the display device via the network and receive the command from the display device via the network.

14. The system of claim 13, wherein the source video stream comprises intra-coded pictures (I-pictures), predictive-coded pictures (P-pictures), and bidirectionally-predictive-coded pictures (B-pictures); and the target video stream comprises the P-pictures or the B-pictures or both in addition to the I-pictures.

15. A non-transitory computer readable storage medium structured to store instructions executable by a processor, the instructions, when executed cause the processor to:

receive a command from a display device over a network, the command indicative of the playback speed and direction at the display device;

convert a source video stream into an intermediate video stream in a compressed format, wherein pictures of the intermediate video stream are intra-frame compressed but not inter-frame compressed;

extract motion vectors of the source video stream;

drop pictures of the intermediate video stream or modify a sequence of pictures of the intermediate video stream to generate a modified video stream based on the command;

encode the modified video stream to generate the target video stream using the extracted motion vectors; and send the target video stream to the display device over the network.

16. The computer readable storage medium of claim 15, wherein the instructions to convert the source video stream into the target video stream comprises instructions to modify a Group of Pictures (GOP) structure in the source video stream by dropping pictures from the source video stream.

17. The computer readable storage medium of claim 15, wherein the instructions to send the target video stream comprise instructions causing the processor to:

packetize the target video stream into packets; and send the packets to the display device over the network.

18. The computer readable storage medium of claim 15, wherein the source video stream comprises intra-coded pictures (I-pictures), predictive-coded pictures (P-pictures), and bidirectionally-predictive-coded pictures (B-pictures); and the target video stream comprises the P-pictures or the B-pictures or both in addition to the I-pictures.

* * * * *